United States Patent
Price

(10) Patent No.: US 6,393,110 B1
(45) Date of Patent: May 21, 2002

(54) METHODS AND APPARATUS FOR TERMINATING A LINE AND SUPPORTING THE ASYMMETRIC DIGITAL SUBSCRIBER LINE PROTOCOL

(75) Inventor: Tim Urry Price, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/163,661

(22) Filed: Sep. 30, 1998

(51) Int. Cl.$^7$ .......................... H04M 11/00; H04M 1/00; H04M 1/76
(52) U.S. Cl. ................. 379/93.01; 379/93.05; 379/93.08; 379/98.09; 379/399.01; 379/412; 379/414; 379/406.01; 379/406.02
(58) Field of Search ................. 379/414, 399, 379/394, 399.01, 406; 370/442–448, 916, 494, 403, 467

(56) References Cited

U.S. PATENT DOCUMENTS

| | | | |
|---|---|---|---|
| 5,280,526 A | | 1/1994 | Laturell ...................... 379/405 |
| 5,399,965 A | * | 3/1995 | Heberle ....................... 324/117 |
| 5,457,601 A | | 10/1995 | Georgopulos et al. ...... 361/686 |
| 5,528,685 A | | 6/1996 | Cwynar et al. ............. 379/405 |
| 5,528,686 A | | 6/1996 | Cwynar et al. ............. 379/405 |
| 5,654,984 A | * | 8/1997 | Hershbarger et al. ....... 375/257 |
| 5,838,667 A | * | 11/1998 | Bingham et al. ........... 370/294 |
| 5,991,335 A | * | 11/1999 | Price .......................... 375/219 |
| 6,069,899 A | * | 5/2000 | Foley .......................... 370/494 |
| 6,144,659 A | * | 11/2000 | Nye et al. .................... 370/359 |

OTHER PUBLICATIONS

"Technical Report TR–007, Interfaces and System Configurations for ADSL: Customer Premises", *ADSL Forum* WT–011–V6, Mar. 1988, pp. 1–28.

"Technical Aspects of ADSL" downloaded from http://www.gsia.cmu.edu/bb26/70–456/projects/adsl/Tech.html on May 22, 1998.

"Asymmetric Digital Subscriber Line (ADSL)" downloaded from http://www.kellogg.nwu.edu/student/4q/TELCOM/GTADSL.htm on May 22, 1998.

"Frequently Asked Questions (last updated Apr. 25, 1997)", downloaded from http://www.adsl.com/general tutorial.html on May 27, 1998.

"General Introduction to Copper Access Technologies", downloaded from http://www.adsl.com/ general tutorial.html on May 27, 1998.

"Technical Report", ADSL Forum TR–001, ADSL Forum System Reference Model downloaded from http://www.adsl.comadsl reference model.html on May 27, 1998.

"ADSL Tutorial: Twisted Pair Access to the Information Highway", downloaded from http://www.adsl.com/adsl tutorial.html on May 27, 1998.

"Growth of Copper Access Lines", Kim Maxwell Independent Editions, downloaded from http://www.adsl.com/copper access growth.html on May 27, 1998.

"Cable Modems and ADSL", downloaded from http://www.adsl.com/adsl vs cable.html on May 27, 1998.

(List continued on next page.)

*Primary Examiner*—Forester W. Isen
*Assistant Examiner*—Ramnandan Singh
(74) *Attorney, Agent, or Firm*—Michaelson & Wallace; Peter L. Michaelson; Janet M. Skafar

(57) ABSTRACT

A digital access arrangement for (i) isolating downstream components from twisted pair copper wire and (ii) separating upstream and downstream communications channels. The line isolation is performed with relatively small, lightweight components, such as an optical isolation unit for example, and can be operated with signals modulated at relatively high frequencies and having relatively high data rates and amplitudes.

18 Claims, 7 Drawing Sheets

OTHER PUBLICATIONS

"Yellowhead.com, ADSL Tutorial" downloaded from http://www.yellowhead.com/adsl.htm on May 22, 1998.

"3Com ADSL Standards" downloaded from http://www.ci-ug.org:8080/keynote12-96/slide24.html on May 22, 1998.

Hewlett Packard, High–Linearity Analog Optocouplers, Technical Data.

"Design Showcase, LAN power supply generates isolated 9V" downloaded from http://www.maxim-ic.com/appnotes on Sep. 21, 1998.

* cited by examiner

METHODS AND APPARATUS FOR TERMINATING A LINE AND SUPPORTING THE ASYMMETRIC DIGITAL SUBSCRIBER LINE PROTOCOL

§1. BACKGROUND OF THE INVENTION

§1.1 Field of the Invention

The present invention concerns methods and apparatus for terminating a line and for supporting the asymmetric digital subscriber line (or "ADSL") protocol. More specifically, the present invention concerns a digital access arrangement for performing line isolation, transmit/receive signal separation, and/or echo cancellation functions.

§1.2 Related Art

As set forth in detail below, the ADSL protocol is believed to be an important technique for data communications, particularly for data communications needed to provide video-on-demand services.

§1.2.1 Unmet Demand for Telecommuting and Video-On-Demand Services

In the near future, it is believed that applications for providing video-on-demand and for facilitating telecommuting will be developed in order to meet perceived demand for such services. First, regarding video-on-demand, current techniques for delivering video entertainment, such as movies, to consumers include television broadcasts, cable services, and video tape and disk rentals. Though television broadcasts and cable services deliver video entertainment to customers' homes, such services are limited in that customers must view such entertainment at a time dictated by a fixed schedule—not necessarily when they want to view such entertainment. Further, VCR type functions such as pause, stop, fast forward, and rewind, are not available.

Although video recorders permit customers to record video programs for later viewing at a convenient time, customers are often put off by the task of setting such video recorders. On the other hand, video tape and disk rentals permit customers to watch a particular movie or program at a time convenient. However, such movies or video programs are not delivered to their home—the customer must pick up and drop off the video tapes or disks. Thus, a service that provides video entertainment to customers (i) at their residences and (ii) when they want it would serve a strong, yet unmet, demand.

§1.2.2 Transmission Facilities to Customer Premises and Their Limitations

Video data can be transmitted to a customer's premises by a physical transmission medium, such as co-axial or fiber optic cable for example, or by a wireless method, such as television broadcast or satellite transmission for example. The limitations of each of these broad categories is discussed below.

The problem with using physical transmission medium is, to the extent not already facilitated by existing plant (e.g., telephone lines, co-axial cable, etc.), such physical transmission medium must be provided to the customer's premises. Installing new transmission medium to the premises of many customers (also referred to as "last mile" transmission) entails tremendous costs. Thus, to the extent that existing infrastructure, and in particular, existing physical transmission medium, exists, such existing infrastructure should be exploited.

Presently, the most prevalent physical transmission media entering customer's premises are (a) twisted pair copper wire (also referred to as "twisted pair") and (b) coaxial and/or hybrid fiber-coaxial (or "HFC") cable. Twisted pair has been used, traditionally, for voice telephone services, and more recently, for data communication by means of modems. Some believe that the use of twisted pair for video-on-demand and telecommuting applications has advantages over the use of coaxial cable or hybrid fiber-coaxial cable for the reasons discussed below. In the following, ADSL is a communications protocol supported over twisted pair. Cable modems are used to communicate data over coaxial or hybrid fiber-coaxial cable.

Installed infrastructure presents the largest advantage of ADSL over cable modems. In 1998, the global ratio of telephone lines to HFC lines is about 400 million to 6 million, or about 60 to 1. Aggressive upgrades from coaxial cable to HFC cable over the next five. (5) to six (6) years will not improve the ratio to better than 10 to 1. Even in the United States, the ratio of telephone lines to HFC lines is on the order of 20 to 1. Based on estimates of the International Telecommunications Union (or "ITU"), in 1995, 700 million telephone lines existed, about 500 million of which served residences and the balance serving businesses and pay telephones.

Regarding line quality, cable modems have the advantage that they do not depend on coaxial cable distance. This is because amplifiers in the cable network boost signal power sufficiently. Unfortunately, however, most existing CATC systems are not HFC, but rather, tree and branch networks of coaxial cable. These networks use one-way amplifiers that preclude upstream data flow. Since 1993, many CATV lines have been installed with two-way amplifiers creating an upstream data path from 5 to 45 MHz. However, the sheer size of these networks (sometimes, as many as 10,000 customers may be served from a single headend) and the noise and channel problems with so many subscribers attached to a common line, make high speed upstream channels unattainable after a few subscribers have joined the line. A unidirectional coaxial CATV network may be upgraded to a bi-directional one by physically replacing amplifiers, at a cost of around $25 per home passed. Upgrading from coaxial to HFC cable requires more work and costs.

On the other hand, ADSL modem speeds will depend on line distance. The longer telephone lines found today may support speeds no greater than 1.5 Mbps. However, the average telephone line will support speeds up to 6 Mbps. Variable rate ADSL modems will be able to adapt their rate to line length.

Finally, telephone networks have historically been more reliable and stable than coaxial cable networks. Thus, some believe that ADSL, rather than cable modems, will be the preferred means of providing video-on-demand services.

Although wireless video transmission methods, such as satellite for example, do not suffer from the "last mile" problem of wiring to each customer's premises, the transmission is one way—from the service provider to the customer. There is no backchannel communications path from the customer's premises to the service provider. User commands are to a tuner at the customer's premises, not to the service provider. Thus, video-on-demand and VCR type functions are not supported by satellite television systems.

§1.2.3 Overview of ADSL

Having described the relative advantages of ADSL for providing video-on-demand services for example, a technical description of ADSL, known to those skilled in the art, is provided in §1.2.3.1 below for the reader's convenience.

§1.2.3.1 Technical Description of ADSL
§1.2.3.1.1 Data Rates

Recall that video-on-demand is believed to be a significant, yet un-served, market. Present video and audio data compression standards, such as the MPEG-2 (i.e., motion pictures expert group) standard, permit full motion video to be represented by a data stream having a rate of about three (3) Mbps. Providing back channel commands, such as program selection and menu navigation, VCR type commands, etc., obviously requires much less bandwidth. ADSL provides a downstream (i.e., from a service provider to a customer) data rate of 0.5 to 8 MBPS, an upstream (i.e., a back channel from the customer to the service provider) data rate of 64 to 640 KBPS, and traditional telephone service (also referred to as "POTS" or "plain old telephone service).

As a practical matter, the length of the local loop, that is the length of the twisted pair copper wire from a customer premises to a central office or other network node, as well as the gauge of the copper wire used in the twisted pair, limits the downstream data rate of ADSL. For 24 gauge (i.e., 5 mm cross section) wire, the downstream data rate limits are as follows:

| | |
|---|---|
| Up to 18,000 feet | 1.544 MBPS (T1) |
| Up to 16,000 feet | 2.048 MBPS (E1) |
| Up to 12,000 feet | 6.312 MBPS (DS2) |
| Up to 9,000 feet | 8.448 MBPS. |

Downstream data rates for 26 gauge (i.e., 4 mm cross section) wire are slightly less.

As discussed above, variable rate ADSL modems will be able to throttle the data rate based on the condition (e.g., length, gauge, etc.) of the local loop serving the customer's premises.

§1.2.3.1.2 Modulation Frequencies

The frequency band of the telephone network was historically limited, by low pass filters at the fringes of the network, from 0 to 3.3 KHz. ADSL requires that these filters be removed. Frequency division multiplexing (or "FDM") is then used to separate the frequency band of the twisted pair into a band for downstream data, a band for upstream data, and a band for POTS. As shown in FIG. 1A, a POTS channel is provided from 0 to 4 KHz, while a POTS guardband extends to 25 KHz. The upstream data channel is provided from about 25 KHz to about 100 KHz. Finally, the downstream data channel is provided from about 120 KHz to about 1.142 MHz. Also, as shown in FIG. 1A, the amplitude of the upstream and downstream signals is +20 dBm. The downstream data channel may be time division multiplexed (TDM) into one or more high and low speed channels. As shown in FIG. 1B, if echo cancellation is provided, the upstream data channel can extend to about 138 KHz such that it partially overlaps the frequency band of the downstream data channel.

§1.2.3.1.3 Modulation Techniques

Two alternative, and incompatible, modulation techniques have been competing; namely, carrierless amplitude phase (or "CAP") modulation and discrete multitone (or "DMT") modulation. Each is briefly discussed below.

CAP modulation is a variant of quadrature amplitude modulation (or "QAM") which is the scheme used in most voice grade modems following the V.32 standard. Basically, CAP modulation uses both multilevel amplitude modulation and phase modulation and initially transmits a "carrierless" signal. The CAP modulation system may use a number of different error correction schemes such as: (i) Reed Solomon forward error correction (or "FEC") in the downstream direction for improving reliability in the event of impulse noise; (ii) an interleaving technique to reduce block error; (iii) Trellis encoding, typically provided in the upstream direction, for minimizing cross-talk, background, and white noise. Since each of these error correction techniques are known to those skilled in the art and not particularly relevant to the present invention, they are not described in further detail. It suffices to note that the forward error correction schemes are important in time sensitive (real time) data applications, such as video-on-demand for example.

DMT modulation divides the bandwidth of the copper line twisted pair into 256, 4 KHz wide, sub-channels, referred to as "bins". These bins are creating by using the fast Fourier transform (or "FFT") at the receiver and inverse fast Fourier transform (or "IFFT") at the transmitter. DMT allocates data to the bins based on the noise then being experienced in each bin. The digital signals may be encoded with error-correcting codes, for dealing with occasional bursts of impulse noise, similar to those employed on compact disks.

§1.2.4 Exemplary Environment in Which the Present Invention May Operate

FIG. 2 is block diagram which depicts an environment 200 in which the present invention may operate. This environment is similar to the ADSL Forum System Reference Model, set forth in Annex A of Technical Report TR-007, entitled "Interfaces and System Configurations for ADSL: Customer Premises" (March 1988). As shown, at a high level, a customer premises 220 is coupled with an access node (such as a central office of a local telephone service provider) 210 via a local loop 230 comprising a twisted pair copper wire. Recall that the data rates which can be supported over the local loop 230 will be limited by the gauge and length of the local loop 230.

At the access node 210, a splitter 212 separates the POTS frequency band from the data frequency bands. Referring back to FIGS. 1A and 1B, the splitter 212 may include a low pass filter for passing frequencies from 0 to 25 KHz to a line (expanded) side input of a voice traffic switch 218. The splitter 212 may also include a high pass filter for passing frequencies above 25 KHz to an ADSL transmission unit 214. The ADSL transmission unit 214 may be coupled to an expanded side input of a data traffic switch or router 216.

A voice network 250, such as the public switched telephone network (or "PSTN") for example, may connected, via one or more trunks 219, with a trunk (concentrated) side input of the voice traffic switch 218. A data network 240, which may also be the PSTN for example, may be connected, via one or more lines 217, with a concentrated side input of the data traffic switch or router 216.

The customer premises 220 may include POTS equipment 224 (such as a telephone and/or a modem for example) and a terminal 228 (such as a personal computer and/or a set top box for example). Like the splitter 212 at the access node 210, a voice/data splitter 222 separates the POTS frequency band from the data frequency bands. Once again, referring back to FIGS. 1A and 1B, the splitter 222 may include a low pass filter for passing frequencies from 0 to 25 KHz to the POTS equipment 224. The splitter 222 may also include a high pass filter for passing frequencies above 25 KHz to an ADSL transmission unit (which may also be referred to as a "terminal adapter") 226. The ADSL transmission unit 226 may be coupled with the terminal 228. Although not shown in FIG. 2, the functions of the voice data splitter 222 may be incorporated into, or provided downstream from, the digital access arrangement 260.

The ADSL transmission unit 226 at the customer premises 220 may include a digital access arrangement (or "DAA") 260, a digital signal processor (or "DSP") 270, and a controller 280. The present invention concerns the digital access arrangement 260. The digital access arrangement 260 basically functions to: (i) isolate the downstream components from the twisted pair copper wire 230; and (ii) separate the upstream and downstream communications channels, for example, by hybrid splitting, transmit/receive signal filtering, and/or echo cancellation. The digital signal processor 270 basically functions to: (i) convert digital signals to analog signals (or "DAC") and analog signals to digital signals (or "ADC"); (ii) modulate outgoing (i.e., upstream) signals and demodulate incoming (i.e., downstream) signals in accordance with either the CAP or DMT modulation methods; and/or (iii) cancel echo. Finally, the controller 280 basically functions to throttle outgoing (i.e., upstream) data rates to 64 Kbps to 640 Kbps and to buffer the incoming (i.e., downstream) data stream so that it may be provided at a data rate compatible with the terminal 228.

§1.2.5.1 Challenges to the Digital Access Arrangement

As introduced above, the digital access arrangement 260 basically functions to (i) isolate the downstream components from the twisted pair copper wire 230; and (ii) separate the upstream and downstream communications channels. Each of these functions, and challenges associated with performing these functions, will be addressed below.

§1.2.5.1.1 Line Isoloation

The twisted pair copper wire 230 may be terminated at the digital access arrangement 260. The twisted pair copper wire 230 includes wires known as a "tip" wire and a "ring" wire. To protect (for example, in the event of lightening striking the local loop or a power line crossing the local loop) a customer and equipment at their premises, the digital access arrangement 260 isolates the twisted pair copper wire 230 from downstream equipment. Traditionally, transformers were used to inductively isolate the tip and ring lines from downstream equipment, such as telephones for example. As shown in FIGS. 1A and 1B, the POTS band is at a lower frequency (i.e., 0 to 4 KHz) and POTS uses a lower power than the upstream and downstream data in ADSL. At the higher frequencies and power used for upstream and downstream data in ADSL, the magnetic cores of transformers must be designed large enough so that they do not saturate or operate in a non-linear region.

This general drawback of using transformers for inductive line isolation actually precludes the use of transformers in certain applications. For example, PCMCIA (or personal computer memory card international association) cards used in portable computers, such as laptop computers and handheld computers cannot use, practically, transformers for isolating ADSL lines. Thus, a digital access arrangement which provides line isolation with smaller and lighter components is needed.

Optical components are relatively small and light components and have been used by modems for line isolation. More specifically, a photo-transmitter (e.g., a light emitting diode, photo diode, photo transistor, etc.) provides a line signal to an adjacent photo-receptor. The receptor generates a voltage based on the state of the adjacent transmitter. Thus, the optical isolators used in modems operate in a "photovoltaic" mode. In addition, the optical isolators used in modems operate in a binary (i.e., either ON or OFF) mode. Unfortunately, these optical components, operating a photovoltaic mode, cannot provide line isolation in relatively high data rate applications.

§1.2.5.1.2 Transmit/Receive Signal Separation

Recall that the tip and ring copper lines of the twisted pair 230 can simultaneously carry both upstream data and downstream data (in addition to POTS which may have already been filtered out). Referring back to FIG. 1A, if frequency division multiplexing (or "FDM") is used, the upstream and downstream data channels can be easily separated by separating, by appropriate filtering for example, the upstream frequency band (e.g., 25 KHz to 100 KHz) from the downstream frequency band (e.g., 120 KHz to 1.142 MHz). Referring back to FIG. 1B, if the frequency bands of the upstream and downstream data channels overlap to some extent, echo cancellation may be used to separate the upstream and downstream data.

§2. SUMMARY OF THE INVENTION

The present invention provides a method for transmitting and receiving data over tip and ring lines. Data may be transmitted by (i) buffering data received from an external source to generate buffered data, (ii) modulating the buffered data in accordance with an ADSL modulation technique (such as CAP or DMT) to generate modulated data, (iii) converting the modulated data to an analog signal, (v) amplifying the analog signal, while passing it over an optical isolation boundary, to generate an amplified analog signal, (v) selectively filtering the amplified analog signal to generate an amplified and filtered analog signal, and (vi) applying the amplified and filtered analog signal to the tip and ring lines. Data may be received by (i) taking a signal appearing across the tip and ring lines, (ii) blocking a DC component of the signal, to generate a non-biased signal, (iii) amplifying the non-biased signal to generate an amplified signal, (iv) converting the amplified signal to a digital signal, and (v) demodulating the digital signal in accordance with an ADSL demodulation technique (such as CAP or DMT).

When selectively filtering the amplified analog signal, frequencies below 25 Khz may be filtered out. Further, frequencies above 100 Khz (or 138 KHz) may also be filtered out.

The analog signal may be amplified by (i) applying the analog signal to a light emitting element, and (ii) receiving an amplified signal, as a current, at a light receiving element. A feedback signal, generated by a second light receiving element, may be applied to the analog signal.

The present invention also provides a device for terminating tip and ring lines. The device may include a line interface stage, a transmission stage, and a reception stage. The line interface stage may be coupled with the tip and ring lines, and may be used to separate, at least to some extent, transmit and receive signals on the tip and ring lines. The transmission stage may be arranged between the line interface stage and a data source. It may include an optical isolation unit for electrically isolating the data source from the tip and ring lines and for amplifying a signal received from the data source. The amplified signal is then provided to the line interface stage. The optical isolation unit of the transmission stage may operate in a photo conductive mode. The reception stage may be arranged between the line interface stage and a data sink. It may include capacitors for electrically isolating the data sink from the tip and ring lines.

The line interface stage may filter signals from the transmission stage to remove frequencies below 25 KHz. The line interface stage may also filter signals from the transmission stage to remove frequencies above 100 KHz (or 138 KHz).

§3. BRIEF DESCRIPTION OF THE DRAWINGS

§4. DETAILED DESCRIPTION

The present invention concerns a novel digital access arrangement, and more specifically, a digital access arrangement to be used with a line carrying ADSL service. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

First, the functions to be performed by the present invention will be described in §4.1 below. Then, an exemplary structure for practicing the present invention will be described in §4.2 below. Finally, an example of the operation of the present invention will be described in §4.3 below.

§4.1 Functions of the Present Invention

The present invention concerns what is commonly referred to as a digital access arrangement. As discussed in §1.2.4 above, digital access arrangements basically function to: (i) isolate the downstream components from the twisted pair copper wire; and (ii) separate the upstream and downstream communications channels, by echo cancellation for example. Such transmit/receive signal separation may be accomplished by providing appropriate filters, such as RC filters for example. Echo cancellation may also be accomplished by providing appropriate filters and/or via known digital signal processing techniques. As discussed in §1.2.5.1.1 above, the line isolation should be performed with relatively small, lightweight component and should be operable with signals modulated at relatively high frequencies and having relatively high data rates and amplitudes. Such isolation is accomplished by providing a transmission stage of a digital access arrangement with an optical isolation unit (which may be operated in a photo conductive mode) and by providing a reception stage of the digital access arrangement with isolation capacitors.

§4.2 Exemplary Structure of the Present Invention

Figure 4:
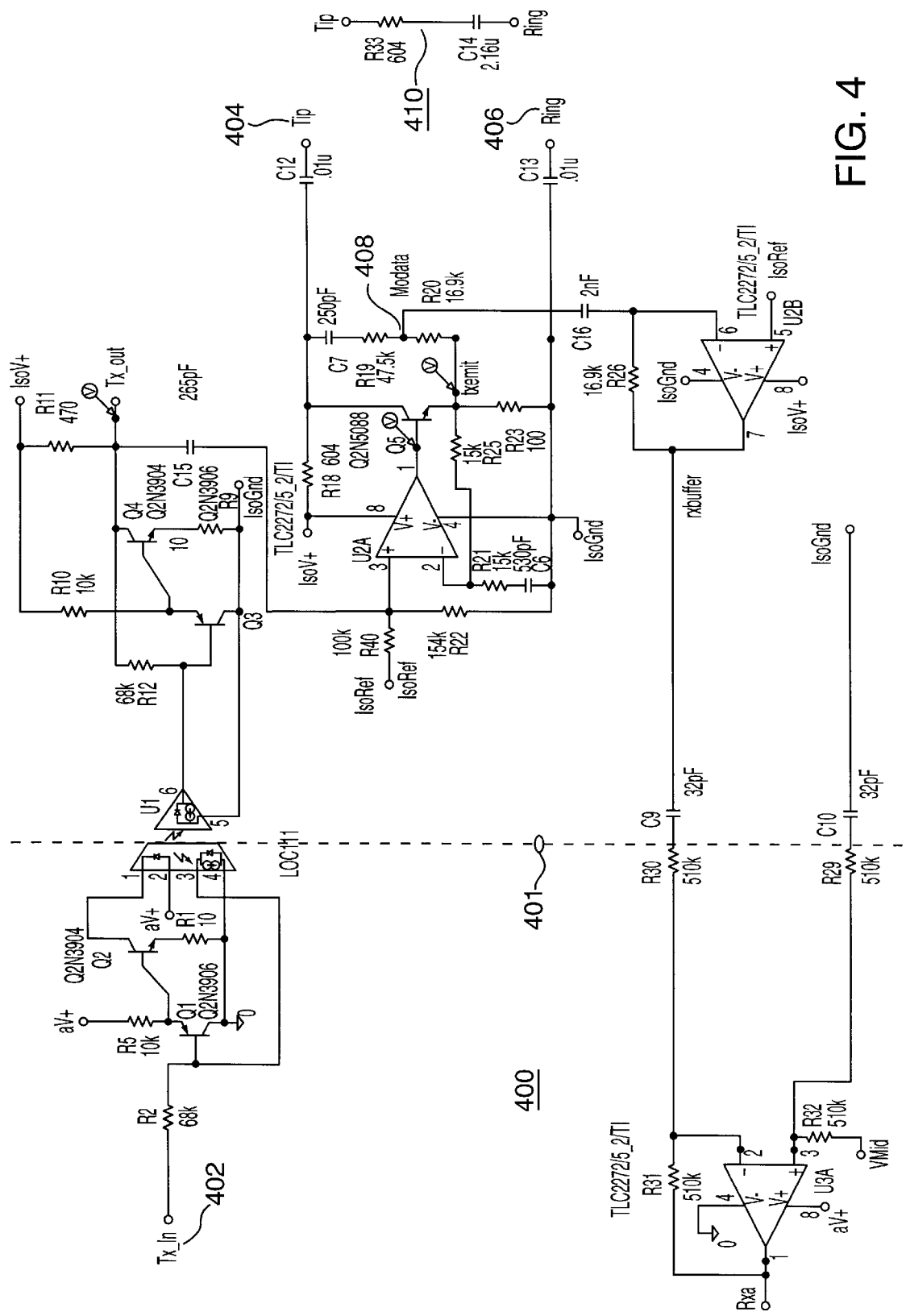
FIG. 4 is a schematic diagram of a digital access arrangement circuit which may be used to practice the present invention.
Figure 5:
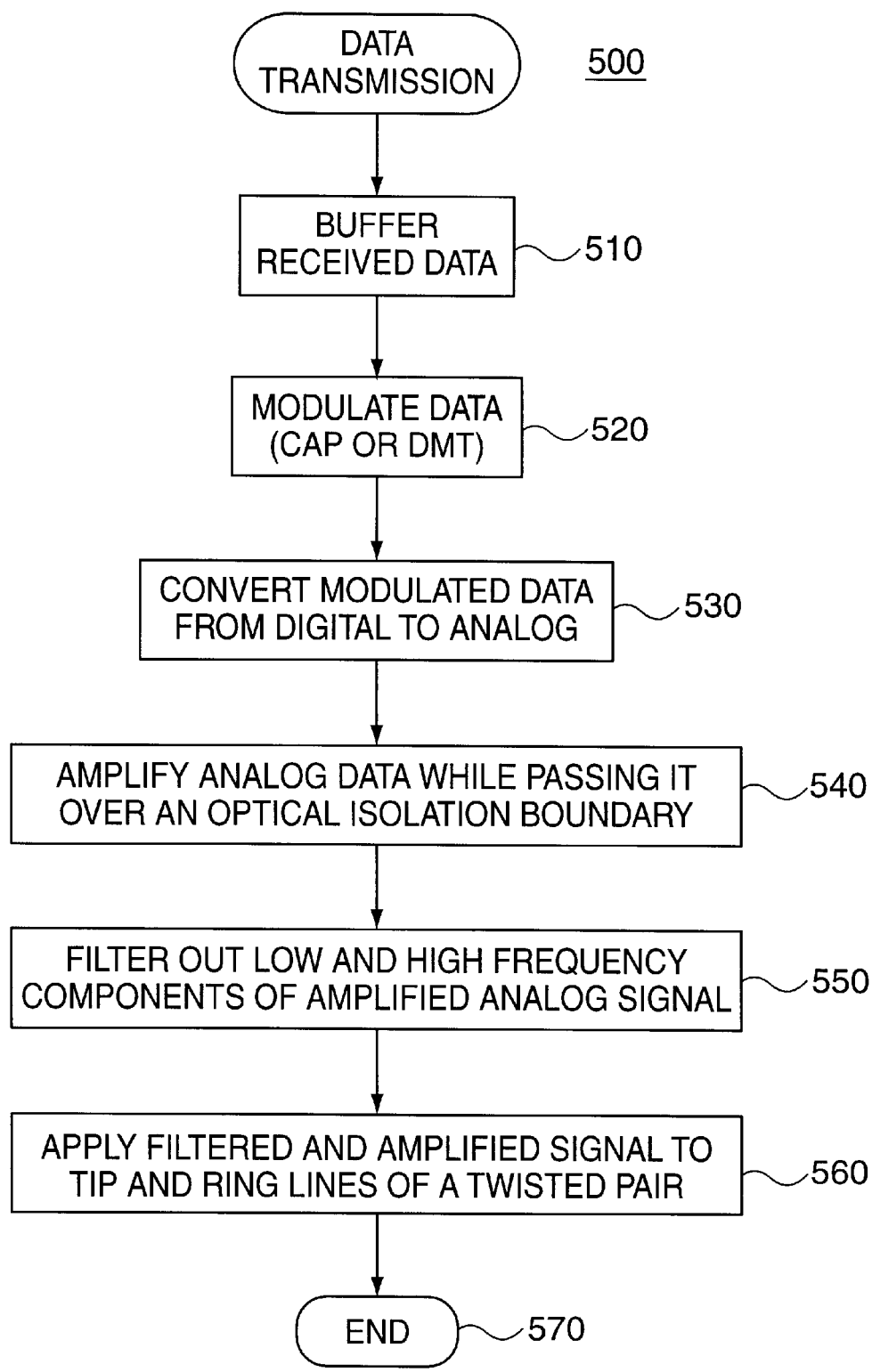
FIG. 5 is a flow diagram of a data transmission process which may be performed by the present invention.
Figure 6:
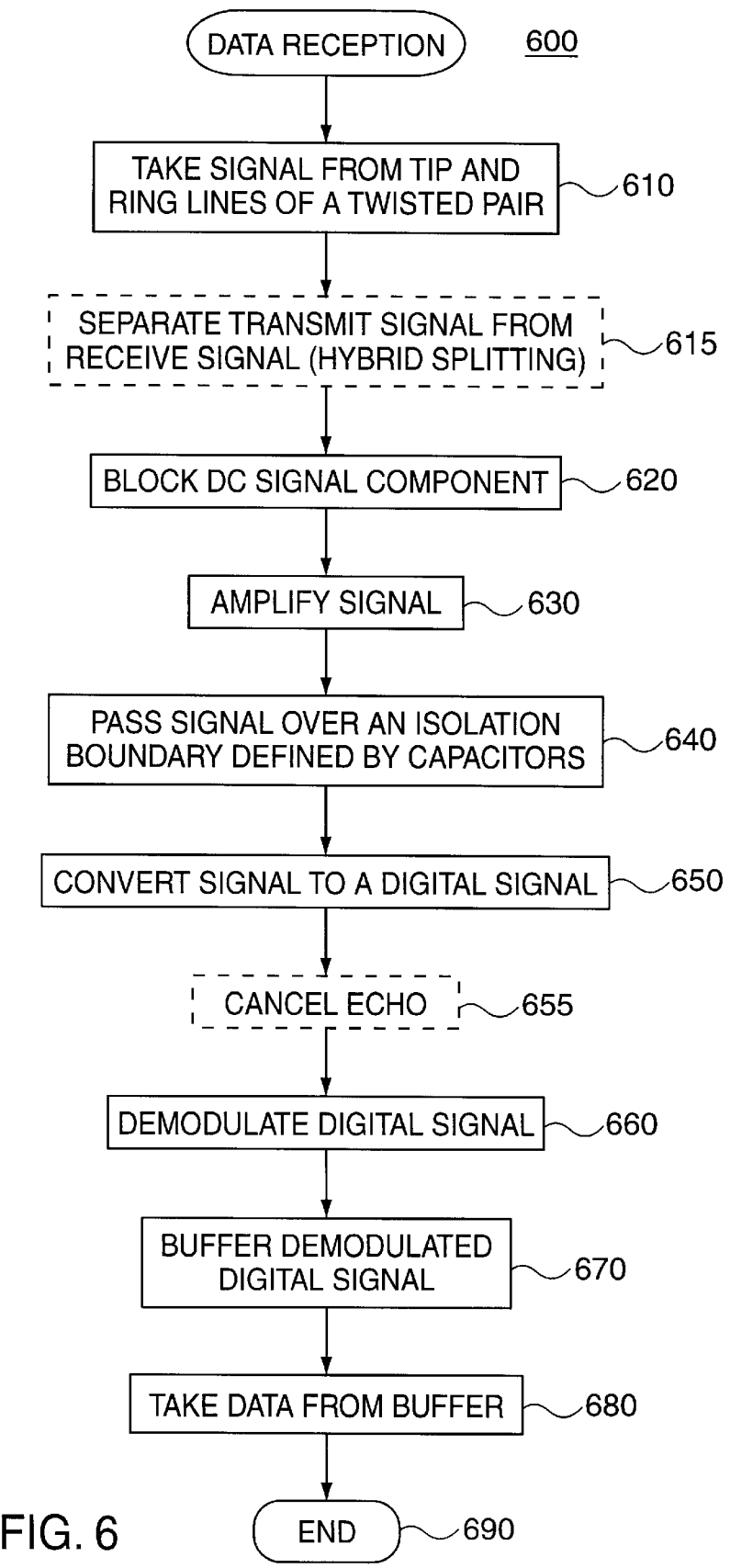
FIG. 6 is a flow diagram of a data reception process which may be performed by the present invention.

FIG. 4 is a schematic diagram of a digital access arrangement (or "DAA") circuit 400 which may be used to practice the present invention. The line isolation boundary is depicted with dashed line 401.

The transmission stage of the DAA circuit 400 is depicted in the top portion of FIG. 4. As shown, an optical isolation unit U1 is used to provide line isolation on the transmission side. The optical isolation unit U1 may be part number CNR200 or CNR201 from Hewlett Packard. The optical isolation unit U1 is operated in a photo conductive mode such that its output current depends linearly, and continuously, from the amplitude of its input. Basically, the transistor Q2 acts as a current amplifier. The base of transistor Q1 is biased based on a feedback signal provided from pins 3 and 4 of the optical isolation unit U1. This feedback bias of Q1 functions to linearize the operation of the transistor Q2.

Transistors Q3 and Q4 re-invert the signal such that Tx_out is in phase with the original Tx_in signal.

The reception stage of the DAA circuit 400 is depicted in the bottom portion of FIG. 4. As shown, a capacitive line isolation is provided by high voltage dielectric capacitors C9 and C10. An optional high impedance input differential amplifier U3A may be used to increase the common mode (i.e., the non-differential) range of the received (i.e., downstream) data and generate a non-differential signal.

Figure 1A:
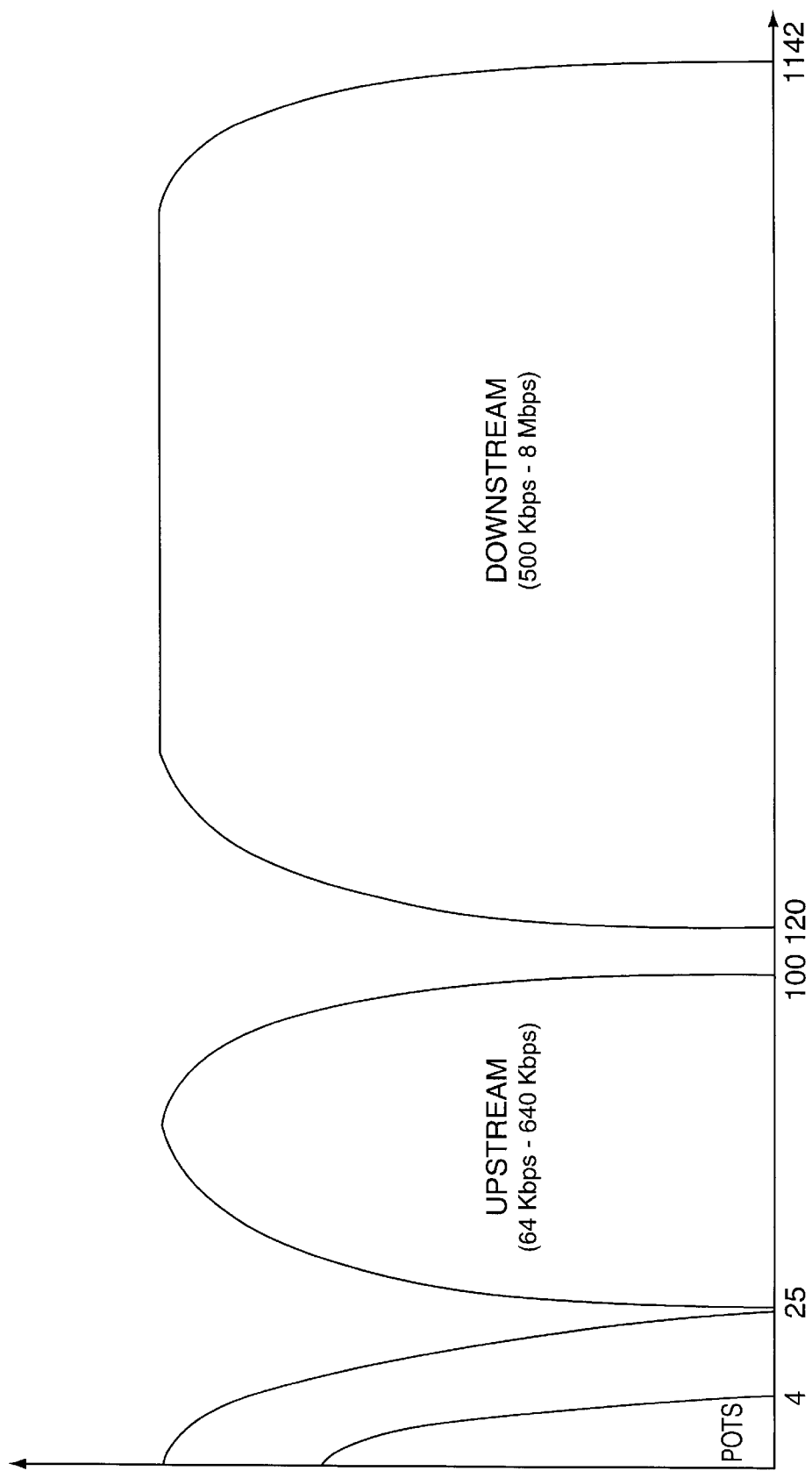
FIG. 1A illustrates the spectrum of frequency bands, and power used in an ADSL service employing frequency division multiplexing.
Figure 1B:
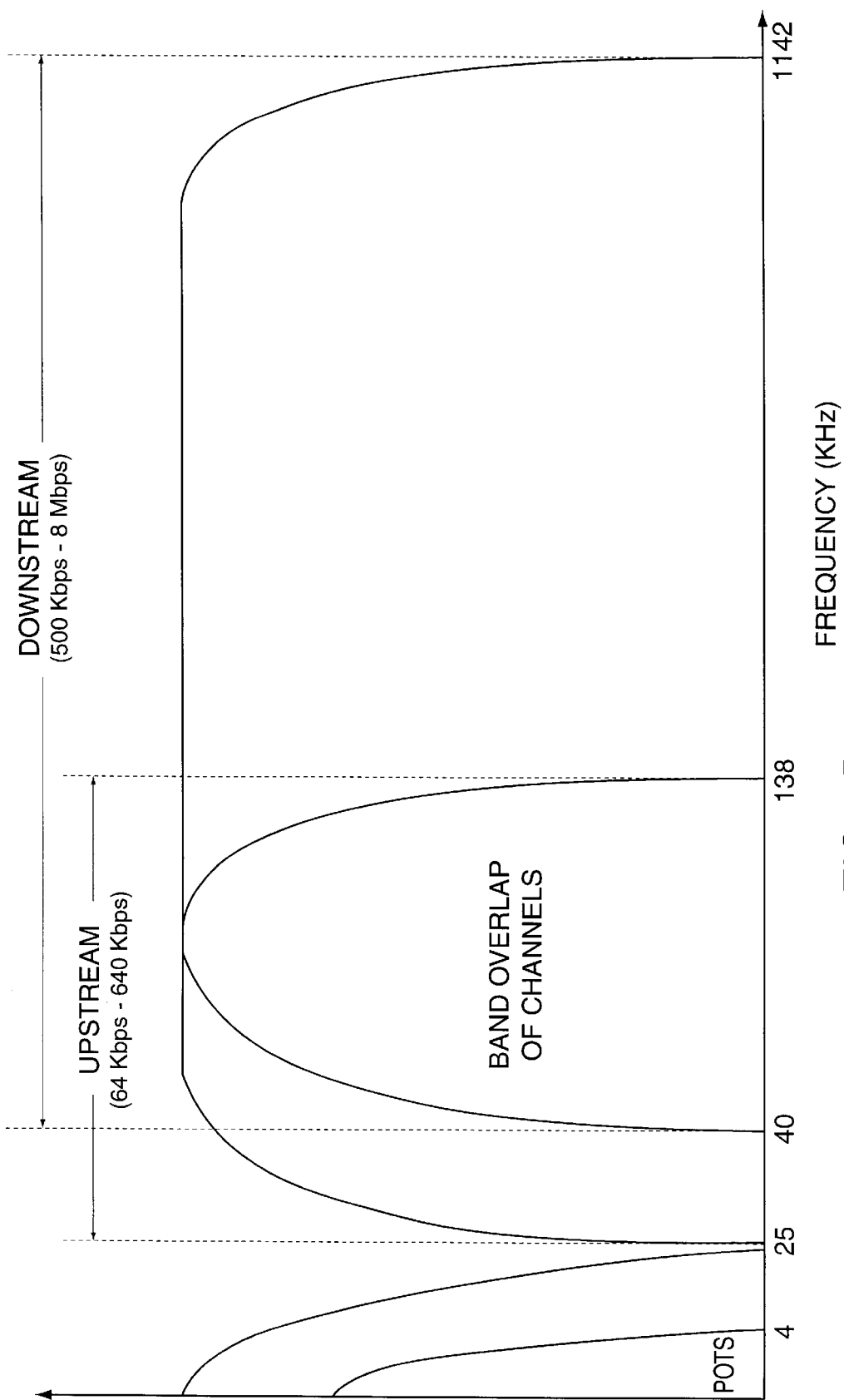
FIG. 1B illustrates the spectrum of frequency bands, and power used in an ADSL service employing echo cancellation.
Figure 2:
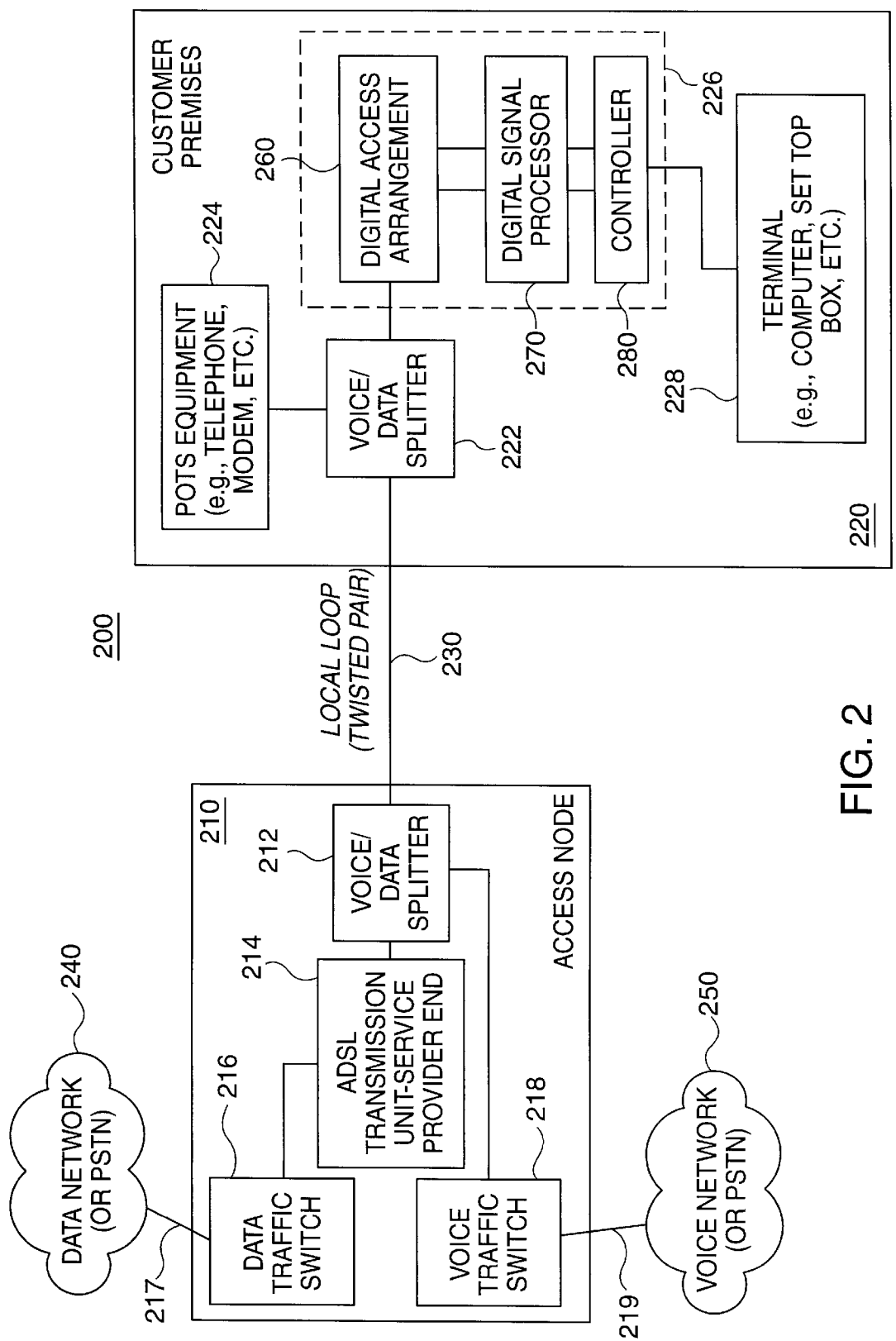
FIG. 2 is a block diagram of an environment in which the present invention may operate.

Capacitors C12, C13, and C15 may be used to define the low frequency cut off of the transmitted (i.e., upstream) data signal, or actually both data signals. Referring to FIGS. 1A and 1B, the values of the capacitors C12, C13, and C15 may be chosen such that the low frequency cut off of the transmitted data signal is about 25 KHz. The series resistor R21 and capacitor C6 may be used to define the upper frequency cut off of the transmitted (i.e., upstream) data signal. Though, referring to FIG. 1A, the upper frequency of the transmitted (or upstream) data signal is 100 KHz if FDM is used, referring to FIG. 1B, the upper frequency cut off of the transmitted (or upstream) data signal should actually be about 138 KHz. Echo cancellation (or signal separation) circuitry is used to separate the upstream and downstream data signals to the extent that their frequencies overlap. The transistor Q5, along with the capacitor C7 and resistors R19 and R20, may be used to provide such echo cancellation (or signal separation). The components which perform the filtering and at least some echo cancellation (shown in the right central portion of FIG. 4) can be thought of as defining a line interface stage.

The components are arranged as shown in FIG. 4. Thus, a detailed description of the individual connections is not necessary and is not presented here. Further, the values of the components are depicted in FIG. 4. The circuit of FIG. 4 may use a known power supply, such as the one described in the design application note, "LAN Power Supply Generates Isolated 9V", downloaded from http://www.maxim-ic.com/AppNotes on Sep. 21, 1998 (from Maxim Integrated Products of Sunnyvale, Calif.).

§4.3 Example of Operation of Disclosed Embodiment

An example of the operation of the exemplary digital access arrangement 400 will now be described with reference to FIGS. 3 through 6. First, an example of transmitting data will be described in §4.3.1 below with reference to FIGS. 3 through 5. Then an example of receiving data will be described in §4.3.2 below with reference to FIGS. 3, 4, and 6.

§4.3.1 Example of Transmitting Data

Figure 3:
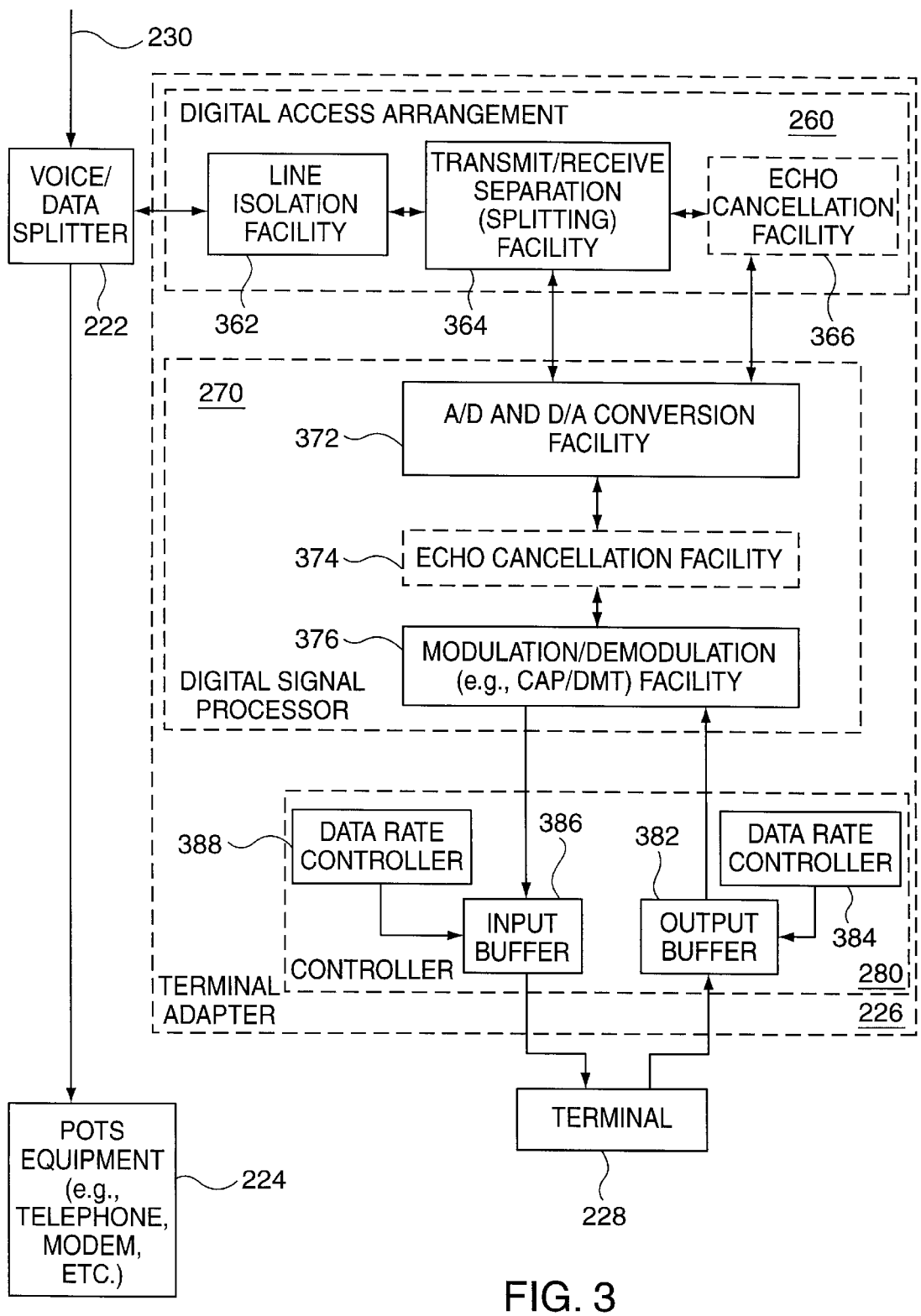
FIG. 3 is a block diagram of a terminal adapter or ADSL transmission unit in which the present invention may operate.

An example of transmitting data will now be described. Referring to FIG. 3, the terminal 228 has some data to send upstream. For example, a customer may have selected a movie to view and entered a personal identification number or an account number. Naturally, other information, such as VCR type control information for example, may be transmitted upstream. This data is buffered in the output buffer 382 of the controller 280. (See, e.g., step 510 of FIG. 5.) Recall from FIGS. 1A and 1B that the upstream data is transmitted at a rate of 64 Kbps to 640 Kbps. Thus, the data rate controller 384 may slow down or speed up the data rate. The transmit data stream is then provided to a digital signal processor 270 which modulates the data in accordance with the carrierless amplitude and phase (or "CAP") modulation technique or the discrete multitone (or "DMT") modulation technique. (See, e.g., step 520 of FIG. 5.) This modulation is done numerically, i.e., digitally. The modulated transmit data stream is then converted from a digital signal to an analog signal and provided to the digital access arrangement 260. (See, e.g., step 530 of FIG. 5.)

Referring now to FIG. 4 which depicts an exemplary digital access arrangement 400, the digital modulated digital transmit data stream Tx_in is applied to the transmit line 402. As the voltage of the applied signal increases, the emitter-base current of the pnp transistor Q1 decreases, thereby increasing the base voltage of the transistor Q2. Consequently, the collector-emitter current of the npn transistor Q2 increases and more current flows from pin 1 to pin 2 of the optical isolation unit U1 and more light is emitted. Consequently, the photoreceptor arranged across pins 3 and 4 of the optical isolation unit U1 causes a current to flow through the diode and then to the base of pnp transistor Q1. The circuit is linearized since the transistor Q1 will begin to conduct more thereby decreasing the voltage applied to the base of the transistor Q2. A photo receptor in the optical isolation unit U1 produces a voltage drop, and thus a current, across pins 6 and 5. The ratio of the voltage at Tx_out to the voltage at Tx_in will be roughly equal to the ratio of R12 to R2.

When the signal applied to the transmit line 402 decreases, the emitter-base current of the pnp transistor Q1 increases, thereby decreasing the base voltage of the transistor Q2. That is, less of the aV+ voltage source is applied to the base of the transistor Q2 via resistor R5. The transistor Q2 therefore conducts less of the voltage from source aV+ causing less current to flow from pin 2 to pin 1 of the optical isolation unit U1, from the collector to the emitter of transistor Q2, via resistor R1, to ground. Thus, the diode arranged across pins 1 and 2 of the optical isolation unit conducts less current, thereby emitting less light. (See, e.g., step 540 of FIG. 5.)

The resistors R9 through R12 and the transistors Q3 and Q4 define a trans-resistance amplifier which converts the current from the optical isolation unit back to a voltage Tx_out. The relationship between Tx_in and Tx_out is constant, linear, and independent of the light output characteristics of the LED.

Still referring to FIG. 4, the resistor R21 and the capacitor C6 serve to filter out frequencies above the transmission band, while capacitors C12, C13, and C15 serve to filter out frequencies below the transmission band. (See, e.g., step 550 of FIG. 5.)

The arrangement of the op amp U2A, the transistor Q5, and the resistors R25 defines an emitter feedback circuit which linearizes the signal. The capacitor C7 and resistors R19 and R20 perform transmit/receive signal separation. Since the emitter of the transistor Q5 is 180 degrees out-of-phase with its collector, the resister divider R19 and R20 is set to minimize the transmit signal for the receive data path. The capacitor C7 is used to block DC as well as unwanted lower frequencies.

Finally, the filtered and amplified analog signal is provided across the tip 404 line and ring 406 line. (See, e.g., step 560 of FIG. 5.)

§4.3.2 Example of Receiving Data

Downstream data is received from the tip 404 and ring 406 coupled with the local loop 410. (See, e.g., step 610 of FIG. 6.) A divided voltage signal, based on the received downstream data, is picked off from node 408 between resistors R19 and R20. The capacitor C7 and resistors R19 and R20 function to remove the majority of any transmitted upstream signal. (See, e.g., optional step 615 of FIG. 6.) The received signal is buffered through op amp U2B. (See, e.g., step 630 of FIG. 6.) The output at pin 7 of the op amp U2B is applied, via high voltage dielectric capacitor C9 and resistor R30 (See, e.g., step 640 of FIG. 6.) to the inverting input (pin 2) of a high impedance input differential op amp configuration. The output at pin 1 of the op amp U3A is provided as the received signal. To reiterate, the high voltage dielectric capacitors C9 and C10 serve to isolate downstream circuits from the tip and ring lines of the local loop 410.

Referring now to FIG. 3, the output at pin 1 of the op amp U3A is provided to an analog to digital converter 372 of the digital signal processor 270. (See, e.g., step 650 of FIG. 6.) Further echo cancellation may be then carried out by echo cancellation facility 374. (See, e.g., optional step 655 of FIG. 6.) Finally, the received signal is demodulated at demodulation facility 376. (See, e.g., step 660 of FIG. 6.) The received signal may be provided to an input buffer 386 which may be emptied at a rate determined by the data rate controller 388 (which, though not shown, may be provided with control signals from the terminal 228). (See, e.g., steps 670 and 680 of FIG. 6.) The buffered received data is then processed at the terminal 228. For example, if the terminal 228 is a set top box, it could decode (or decompress) an MPEG video stream and provide an NTSC ("National Television Standards Committee") or PAL or S-video or HDTV ("high definition television") signal to a television monitor.

§4.4 SUMMARY

Thus, the digital access arrangement designed in accordance with the present invention (i) isolates the downstream components from the twisted pair copper wire; and (ii) separates the upstream and downstream communications channels. The line isolation is performed with relatively small, lightweight components and can be operated with signals modulated at relatively high frequencies and having relatively high data rates and amplitudes.

What is claimed is:

1. A method for transmitting and receiving data over tip and ring lines, the method comprising:
   a) transmitting data by
      i) buffering data received from an external source, thereby generating buffered data,
      ii) modulating the buffered data in accordance with an ADSL modulation technique, thereby generating modulated data,
      iii) converting the modulated data to an analog signal,
      iv) amplifying the analog signal while passing it over an optical isolation boundary, thereby generating an amplified analog signal, that is a current;
      v) passing the amplified analog signal that is a current through a transresistor amplifier to generate an amplified analog signal that is a voltage;
      vi selectively filtering the amplified analog signal, thereby generating an amplified and filtered analog signal, and
      vii applying the amplified and filtered analog signal to the tip and ring lines; and
   b) receiving data by
      i) taking a signal appearing across the tip and ring lines,
      ii) blocking a DC component of the signal, to generate a non-biased signal,
      iii) amplifying the non-biased signal to generate an amplified signal,
      iv) converting the amplified signal to a digital signal, and
      v) demodulating the digital signal in accordance with an ADSL demodulation technique.

2. The method of claim 1 wherein the receiving data further comprises filtering out transmitted data from the signal appearing across the tip and ring lines.

3. The method of claim 1 wherein the receiving data further comprises canceling echo from the digital signal.

4. The method of claim 1 wherein the ADSL modulation technique is carrierless amplitude phase modulation.

5. The method of claim 1 wherein the ADSL modulation technique is discrete multitone modulation.

6. A method for transmitting data over tip and ring lines, the method comprising:
   a) buffering data received from an external source, thereby generating buffered data;
   b) modulating the buffered data in accordance with an ADSL modulation technique, thereby generating modulated data;
   c) converting the modulated data to an analog signal;
   d) amplifying the analog signal while passing it over an optical isolation boundary, thereby generating an amplified analog signal, that is a current;
   e) passing the amplified analog signal that is a current through a transresistor amplifier to generate an amplified analog signal that is a voltage;
   f) selectively filtering the amplified analog signal that is a voltage, thereby generating an amplified and filtered analog signal; and
   g) applying the amplified and filtered analog signal to the tip and ring lines.

7. The method of claim 6 wherein the selectively filtering comprises filtering out frequencies below 25 KHz.

8. The method of claim 7 wherein the selectively filtering comprises filtering out frequencies above 100 KHz.

9. The method of claim 7 wherein the selectively filtering comprises filtering out frequencies above 138 KHz.

10. The method of claim 6 wherein the amplifying the analog signal while passing it over an optical isolation boundary comprises:
    i) applying the analog signal to a light emitting element, and
    ii) receiving an amplified signal, as a current, at a light receiving element.

11. The method of claim 10 wherein the amplifying the analog signal while passing it over an optical isolation boundary further comprises:
    iii) applying a feedback signal, generated by a second light receiving element, to the analog signal, whereby the amplifying is linear.

12. A device for terminating tip and ring lines, the device comprising:
    a) a line interface stage, coupled with the tip and ring lines, for separating, at least to some extent, transmit and receive signals;
    b) a transmission stage, arranged between the line interface stage and a data source, the transmission stage comprising
       i) an optical isolation unit for electrically isolating the data source from the tip and ring lines and for amplifying a signal received from the data source to provide an amplified analog signal that is a current, and
       ii) a transresistor amplifier that receives the amplified analog signal that is a current and generates an amplified analog signal that is a voltage; and
    c) a reception stage, arranged between the line interface stage and a data sink, the reception stage comprising
       i) capacitors for electrically isolating the data sink from the tip and ring lines.

13. The device of claim 12 wherein the line interface stage comprises a filter for filtering out frequencies below 25 KHz of signals from the transmission stage.

14. The device of claim 12 wherein the line interface stage comprises a filter for filtering out frequencies above 100 KHz of signals from the transmission stage.

15. The device of claim 12 wherein the line interface stage comprises a filter for filtering out frequencies above 138 KHz of signals from the transmission stage.

16. The device of claim 12 wherein the optical isolation unit of the transmission stage operates in a photo conductive mode.

17. A device for transmitting and receiving data in accordance with the asymmetric digital subscriber line protocol, the device comprising:
    a) a transmission stage comprising an optical isolation unit for electrically isolating a data source from tip and ring lines and for amplifying a signal received from the data source to provide an amplified analog signal that is a current, wherein the amplified analog signal that is a current is passed through a transresistor amplifier to generate an amplified analog signal that is a voltage; and
    b) a reception stage comprising capacitors for electrically isolating a data sink from the tip and ring lines.

18. A terminal adapter for interfacing a terminal to tip and ring lines, the terminal adapter comprising:
    a) a splitter, coupled with the tip and ring lines, for separating voice signals and data signals;
    b) a digital access arrangement, coupled with the splitter, and comprising
       i) a transmission stage comprising an optical isolation unit for electrically isolating the terminal from the tip and ring lines and for amplifying a signal received from the terminal, the optical isolation unit to provide an amplified analog signal that is a current, wherein the amplified analog signal is passed through a transresistor amplifier to generate an amplified analog signal that is a voltage, and a filter filters the amplified analog signal which is applied to the tip and ring lines, and
       ii) a reception stage comprising capacitors for electrically isolating the terminal from the tip and ring lines;
    c) a digital signal processor coupled with the digital access arrangement and comprising
       i) an analog to digital converter for converting analog signals from the reception stage to digital receive signals,
       ii) a demodulator for demodulating the digital receive signals in accordance with an ADSL demodulation technique,
       iii) a modulator for modulating a digital signal in accordance with an ADSL modulation technique,
       iv) a digital to analog converter for converting digital signals from the modulator to analog signals provided to the transmission stage, and
       v) an echo cancellation facility for removing a transmitted signal from a received signal; and
    d) a controller, arranged between the terminal and the digital signal processor, for controlling the rate of data exchanged between the digital signal processor and the terminal.

* * * * *